United States Patent
Liao et al.

(10) Patent No.: US 10,778,086 B1
(45) Date of Patent: Sep. 15, 2020

(54) POWER-SWITCHING CIRCUIT WITH SOFT-START CIRCUIT

(71) Applicant: QUANTA COMPUTER INC., Taoyuan (TW)

(72) Inventors: Yu-Shin Liao, Taoyuan (TW);
Kuo-Chan Hsu, Taoyuan (TW);
Yun-Teng Shih, Taoyuan (TW);
Cheng-Hung Yu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/440,499

(22) Filed: Jun. 13, 2019

(51) Int. Cl.
*H02M 1/36* (2007.01)
*H02M 1/08* (2006.01)
*H02M 1/00* (2006.01)

(52) U.S. Cl.
CPC .............. *H02M 1/36* (2013.01); *H02M 1/08* (2013.01); *H02M 2001/0032* (2013.01)

(58) Field of Classification Search
CPC ... H02M 1/36; H02M 1/08; H02M 2001/0032
See application file for complete search history.

(56) References Cited

U.S. PATENT DOCUMENTS

| | | | |
|---|---|---|---|
| 7,466,573 | B2 | 12/2008 | Kojori et al. |
| 10,027,223 | B1 | 7/2018 | Zhang et al. |
| 2006/0082352 | A1* | 4/2006 | Warita ............... H02M 1/36 323/272 |
| 2012/0117393 | A1 | 5/2012 | Carter et al. |
| 2016/0181814 | A1 | 6/2016 | Huang et al. |

OTHER PUBLICATIONS

TW Office Action for Application No. 108134146, dated Apr. 13, 2020, w/ First Office Action Summary.
Extended European Search Report for EP Application No. 19203919.6, dated May 15, 2020.

* cited by examiner

*Primary Examiner* — John W Poos
(74) *Attorney, Agent, or Firm* — Nixon Peabody LLP

(57) ABSTRACT

A power source switching circuit for powering an electronic component includes a soft-start circuit, a first input connected to a standby power source, a second input connected to a main power source, and an output. The output provides a voltage to the electronic component and is configured to be alternatively electrically connected to the first input or the second input. When the power source switching circuit is in a standby mode, the output is connected to the first input and the standby power source. When the power source switching circuit is in a main mode, the output is connected to the second input and the main power source. When the power source switching circuit is initially activated to the standby mode, the soft-start circuit is enabled. When the power source switching circuit subsequently switched from the main mode to the standby mode, the soft-start circuit is disabled.

20 Claims, 4 Drawing Sheets

POWER-SWITCHING CIRCUIT WITH SOFT-START CIRCUIT

TECHNICAL FIELD

The present disclosure relates generally to a power source switching circuit. More particularly, aspects of this disclosure relate to a power source switching circuit that provides soft-start functionality that can be enabled and disabled.

BACKGROUND

Electronic devices such as servers, desktop computers, and laptop computers can often be alternatively powered by different power sources depending on the mode of operation. For example, a standby mode may use a standby power source that provides only a minimum amount of power necessary to keep the electronic device in standby mode. However, a main mode may require a larger amount of power than the standby mode. Thus, a separate main power source may be required to provide the power needed for operation in the main mode. Power source switching circuits can be used to switch between standby power sources and main power sources.

To prevent a large inrush of current during startup, main power source switching circuits also utilize soft-start functionality, where the power provided to the electronic device is slowly increased from zero to the full amount of the standby power sources. The gradual increase to the standby power prevents components of the electronic device from being damaged. However, the presence of soft-start functionality can often cause the power provided to the electronic device to temporarily decrease when switching back to standby power.

Thus, there is a need for a power source switching circuit that can effectively switch between standby power and main power; provide soft-start functionality when initially switching to standby power; and prevent temporary power or voltage decreases from occurring when switching back to standby power from main power.

SUMMARY

The various examples of the present disclosure are directed towards power source switching circuits for powering an electronic component. In a first embodiment of the present disclosure, the power source switching circuit comprises a soft-start circuit, a first input, a second input, and an output. The first input is connected to a standby power source. The second input is connected to a main power source. The output is configured to alternatively be electrically connected to (i) the first input and the standby power source when the power source switching circuit is in a standby mode, or (ii) the second input and the main power source when the power source switching circuit is in a main mode. The soft-start circuit is enabled when the power source switching circuit is initially activated to the standby mode. The soft-start circuit is disabled when the power source switching circuit subsequently switches from the main mode to the standby mode.

In some examples of the first embodiment, the power source switching circuit further comprises a bypass circuit connected to the soft-start circuit. The bypass circuit is inactive when the power source switching circuit is initially activated to the standby mode, to thereby enable the soft-start circuit. The bypass circuit is active when the power source switching circuit subsequently switches from the main mode to the standby mode, to thereby disable the soft-start circuit.

In some examples of the first embodiment, the bypass circuit is activated in response to the output initially being connected to the standby power source, such that the bypass circuit is inactive prior to the output initially being connected to the power source.

In some examples of the first embodiment, when the power source switching circuit is initially activated to the standby mode, the soft-start circuit causes the output of the power source switching circuit to gradually connect to the standby power source, such that the voltage provided by the output gradually increases to a standby voltage. The voltage provided by the output reaches the standby voltage after a standby activation time delay.

In some examples of the first embodiment, when the power source switching circuit switches from the main mode to the standby mode, the voltage provided by the output switches from a main voltage to the standby voltage after substantially no time delay.

In some examples of the first embodiment, the power source switching circuit further comprises a main power transistor, a standby power transistor, and a control signal. The main power transistor selectively electrically connects the output to the main power source. The standby power transistor selectively electrically connects the output to the standby power source. The control signal is selectively operable to have (i) a standby state wherein the output is connected to the standby power source and disconnected from the main power source, and (ii) a main state wherein the output is connected to the main power source and disconnected from the standby power source.

In some examples of the first embodiment, the soft-start circuit includes a control transistor and a delay transistor. A gate of the control transistor is connected to the control signal, a drain of the control transistor is connected to the standby power source, and a source of the control transistor is connected to ground. A gate of the delay transistor is connected to the drain of the control transistor and the standby power source, a drain of the delay transistor is connected to a gate of the standby power transistor, and a source of the delay transistor is connected to an RC circuit.

In some examples of the first embodiment, the control transistor turns off responsive to the control signal being in the standby state, so as to connect the gate of the delay transistor to the standby power source and turn on the delay transistor.

In some examples of the first embodiment, the turning on of the delay transistor connects the gate of the standby power transistor to the RC circuit through the drain and the source of the delay transistor, the RC circuit causing the standby power transistor to gradually turn on and gradually connect the standby power source to the output.

In some examples of the first embodiment, the RC circuit includes a resistor and a capacitor connected in parallel, and a time constant of the RC circuit is substantially equal to the standby activation time delay.

In some examples of the first embodiment, the control transistor turns on to connect the gate of the delay transistor to ground and turn off the delay transistor, responsive to the control signal being in the main state. The turning off of the delay transistor turns off the standby power transistor with substantially no time delay In some examples of the first embodiment, the power source switching circuit further comprises a first bypass transistor and a second bypass transistor. The first bypass transistor has a gate connected to the control signal such that the first bypass transistor turns on in response to the control signal switching from the main state to the standby state. The second bypass transistor has a gate connected to both the drain of the first bypass transistor and a bypass power source. The bypass power source selectively provides a logically high voltage.

In some examples of the first embodiment, a source of the first bypass transistor is connected to ground, and a drain of the first bypass transistor is connected to the gate of the second bypass transistor. Further, a source of the second bypass transistor is connected to ground and a drain of the second bypass transistor is connected to the gate of the standby power transistor.

In some examples of the first embodiment, the gate of the second bypass transistor is pulled to a logically high value and the second bypass transistor is turned on, in response to the control signal switching from the main state to the standby state and turning off the first bypass transistor.

In some examples of the first embodiment, the gate of the standby power transistor is pulled to a logically low level and the standby power transistor is turned on with substantially no time delay, in response to the control signal switching from the main state to the standby state.

In some examples of the first embodiment, the gate of the second bypass transistor is pulled to a logically low level and the second bypass transistor is turned off, in response to the control signal being in the main state and turning on the first bypass transistor.

In some examples of the first embodiment, the gate of the standby power transistor is pulled to a logically high level and the standby power transistor is turned off, in response to the control signal being in the main state.

In some examples of the first embodiment, the bypass power source does not provide the logically high voltage to the drain of the first bypass transistor and the gate of the second bypass transistor when the power source switching circuit is initially activated to the standby mode, to thereby enable the soft-start circuit.

In some examples of the first embodiment, the bypass power source provides the logically high voltage to the drain of the first bypass transistor and the gate of the second bypass transistor when the power source switching circuit switches from main mode to standby mode, to thereby disable the soft-start circuit.

In some examples of the first embodiment, the power source switching circuit further comprises a power converter having an input and an output. The input of the power converter is connected to the output of the power source switching circuit. The output of the power converter forms the bypass power source. The output of the power converter provides the logically high voltage when the power source switching circuit switches from the main mode to the standby mode after being initially activated to the standby mode.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
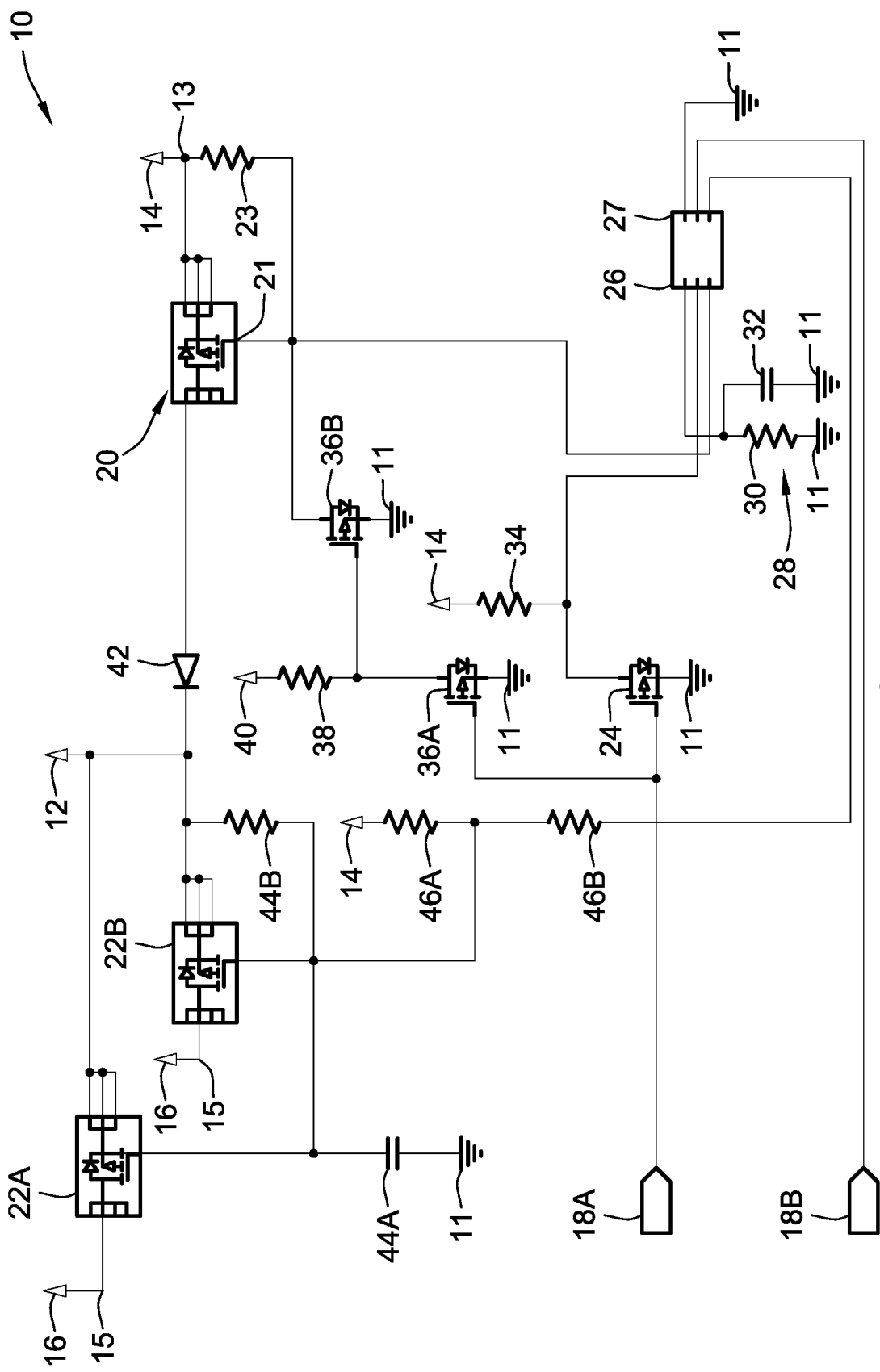
FIG. 1 is a power source switching circuit for switching between a standby power source and a main power source.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a power source switching circuit for powering an electronic component or system. The power source switching circuit has inputs that connect to both a standby power source a main power source, and an output that connects the electronic component or system. When the electronic component or system is initially activated, the power source switching circuit connects the electronic component or system to the standby power source. The power source switching circuit also provides soft-start functionality that slowly increases the power provided at the output of the power source switching circuit when the electronic component or system is initially activated. The power source switching circuit can switch between connecting its output to the standby power source and connecting its output to the main power source. The power source switching circuit can thus switch between providing standby power to the electronic component or system, and providing main (or operating) power to the electronic component or system, via the output. When the power source switching circuit switches back to standby power from main power, the soft start functionality is disabled so as to avoid any temporary decrease in the voltage provided by the output FIG. 1 illustrates power source switching circuit 10 for powering an electronic device. The electronic device can be a server, a desktop computer, a laptop computer, or any other suitable electronic device. The power source switching circuit 10 includes a power rail 12; a first input 13 connected to a standby power source 14; and a second input 15 connected to a main power source 16. Power or voltage that is connected to the power source switching circuit 10 via the first input 13 or the second input 15 is transmitted to the output of the power source switching circuit 10, which in the implementation illustrated in FIG. 1, is the power rail 12.

When the power rail 12 is connected to the standby power source 14, the power rail 12 provides a standby voltage. The power source switching circuit 10 is thus in a standby mode. A number of different components of the power source switching circuit 10 are connected to the standby power source 14. When the power rail 12 is connected to the main power source 16, the power rail 12 provides a main voltage. The power source switching circuit 10 is thus in a main mode. The power source switching circuit 10 includes one or more control signals that alternate between a standby state and a main state. The control signals cause the power source switching circuit to alternate between the standby mode and the main mode, and thus cause the power rail 12 to alternate between being connected to the standby power source 14 and the main power source 16.

In the implementation illustrated in FIG. 1, the power source switching circuit 10 includes a first control signal 18A and a second control signal 18B. Both the first control signal 18A and the second control signal 18B can alternate between a standby state and a main state. When the first and second control signals 18A and 18B are both in their standby states, the power source switching circuit 10 is in the standby mode and the power rail 12 is connected to the standby power source 14. When the first and second control signals 18A and 18B are both in their main states, the power source switching circuit 10 is in the main mode and the power rail 12 is connected to the main power source 16.

The power source switching circuit 10 includes a number of transistors that are used as switches to alternatively electrically connect the power rail 12 to either the standby power source 14 or the main power source 16. A standby power transistor 20 electrically connects the power rail 12 to the standby power source 14 when the standby power transistor 20 is turned on. A diode 42 can be connected between the standby power transistor 20 and the standby and the power rail 12 to ensure that current only flows from the standby power source to the power rail 12. Main power transistors 22A and 22B electrically connect the power rail 12 to the main power source 16 when the main power transistors 22A and 22B are turned on.

The number of main power transistors used to connect the main power source 16 to the power rail 12 is dependent upon the maximum current provided by the main power source 16. In some implementations (including the illustrated implementation), multiple main power transistors are needed to share the current flowing from the main power source 16 to the power rail 12. If the amount of current flowing through the transistors connecting the main power source 16 to the power rail 12 is greater than any one of the main power transistors can sustain, the main power transistor will break down, and the power provided to the electronic component or system will be cut off.

The power source switching circuit 10 is electrically connected to a power supply unit (PSU) (not shown). The PSU has an input that connects to mains AC power, and two outputs that acts as the standby power source 14 and the main power source 16. The standby power source 14 of the PSU is connected to the first input 13 of the power source switching circuit 10, and the main power source 16 is connected to the second input 15 of the power source switching circuit 10. The power rail 12 then outputs either standby power or main power that is used to power the electronic component. Generally, the current draw available from the main power source 16 is higher than the current draw available from the standby power source 14.

The power source switching circuit 10 utilizes soft-start functionality to prevent a large inrush of current to the electronic device when the power source switching circuit 10 and/or the PSU are first activated to provide standby power. Some components in the electronic device will require a small time delay before they are fully powered so they can properly stabilize. For example, capacitors must be charged, inductors must have their flux stabilized, and active components (such as integrated circuits) must change from an inactive state to an active state.

To provide the soft-start functionality, the power source switching circuit 10 includes a soft-start circuit. When the power source switching circuit 10 is initially activated and powered-on to the standby power, the soft-start circuit is enabled. The voltage at the power rail 12 thus gradually increases from zero up to the standby voltage. The voltage at the power rail 12 reaches the standby voltage after a standby activation time delay. As a result, the components are stabilized before the voltage and current reach their peak values.

When the power source switching circuit 10 switches from the main power source 16 back to the standby power source 14 during an input power switch, the soft-start circuit is disabled. Therefore, the voltage provided by the power rail 12 switches from the main voltage to the standby voltage after substantially no time delay.

The soft-start circuit includes a control transistor 24, a delay transistor 26, a connection transistor 27, and an RC circuit 28. In the implementation illustrated in FIG. 1, the delay transistor 26 and the connection transistor 27 are part of a single dual-channel integrated circuit, and thus are shown as part of the same integrated circuit package. In other implementations however, the delay transistor 26 and the connection transistor 27 are located within separate distinct integrated circuit packages.

In the implementation illustrated in FIG. 1, the RC circuit 28 includes a resistor 30 and a capacitor 32. Other RC circuits 28 can also be used in other implementations. When the power source switching circuit 10 is first activated, the first control signal 18A and the second control signal 18B are set to their standby states (e.g., are set to a logically low voltage), thereby indicating that the power rail 12 should be connected to the standby power source 14 to provide the standby voltage to the electronic component or system.

The gate of the control transistor 24 is connected to the first control signal 18A. The first control signal 18A thus controls the activation of the control transistor 24. The source of the control transistor 24 is connected to a ground 11 of the power source switching circuit 10. The drain of the control transistor 24 is connected to both the standby power source 14 through a resistor 34, and the gate of the delay transistor 26. The source of the delay transistor 26 is connected to both the resistor 30 and the capacitor 32 of the RC circuit 28. The drain of the delay transistor 26 is connected to the gate of the standby power transistor 20, which is also connected to the standby power source 14.

When the power source switching circuit 10 is first activated, the first control signal 18A is set to low (e.g., the standby state), thus turning off the control transistor 24. Because the control transistor 24 is off, the gate of the delay transistor 26 is connected to the standby power source 14 through the resistor 34, which turns on the delay transistor 26. Because the gate 21 of the standby power transistor 20 is connected to the standby power source 14, the gate 21 of the standby power transistor 20 is initially pulled to a logically high value. Because the standby power transistor 20 is a p-type transistor, the standby power transistor 20 is initially turned off. The power rail 12 thus does not provide any voltage initially, despite the power source switching circuit 10 being activated.

Due to the RC circuit 28, the capacitor 32 slowly charges once the power source switching circuit 10 is activated. As the capacitor 32 slowly charges, the voltage at the gate 21 of the standby power transistor 20 gradually decreases, which in turn gradually turns on the standby power transistor 20. The standby power source 14 is therefore gradually connected to the power rail 12, which allows the voltage provided by the power rail 12 to gradually increase from zero to the standby voltage level. In some implementations, the time constant of the RC circuit 28 is substantially equal to the standby activation time delay.

Figure 2:
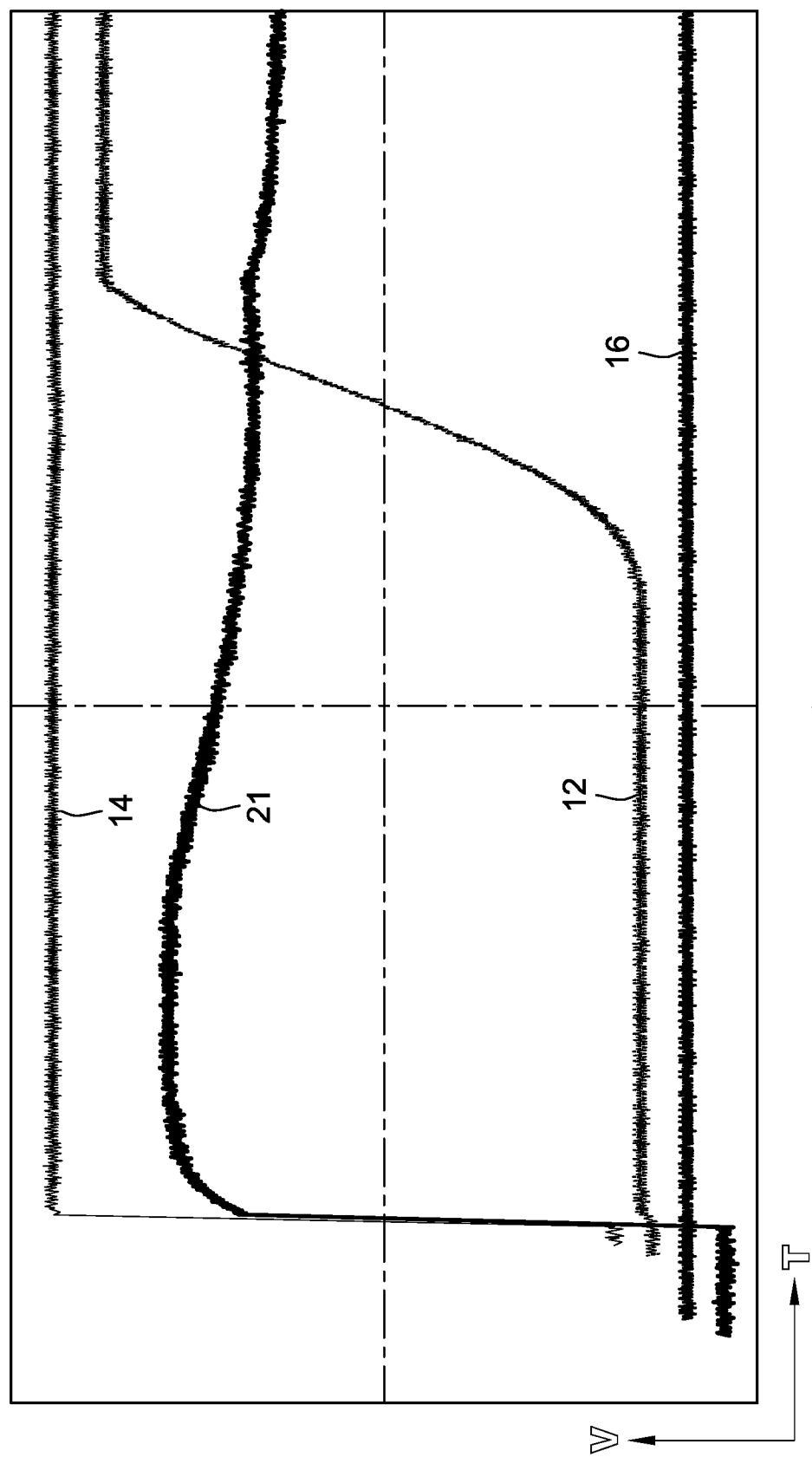
FIG. 2 is a voltage vs. time diagram showing the soft-start functionality of the power source switching circuit of FIG. 1.

FIG. 2 shows a voltage vs. time diagram of the power rail 12, the standby power source 14, and the gate 21 of the standby power transistor 20 (in FIG. 1), when the power supply unit is initially connected to the power source switching circuit 10 (in FIG. 1), and the power source switching circuit 10 is initially activated to provide power to the power rail 12. The voltage of the standby power source 14 (in FIG. 1) is constant once connected to the power source switching circuit 10. However, due to the RC circuit 28 (in FIG. 1), the voltage at the gate 21 of the standby power transistor 20 is initially high, which turns the standby power transistor 20 off. When the standby power transistor 20 is off, the power rail 12 is not connected to the standby power source 14, and thus the voltage of the power rail 12 is low or zero. As the capacitor 32 (in FIG. 1) of the RC circuit 28 charges, the voltage at the gate 21 of the standby power transistor 20 gradually decreases. The standby power transistor 20 is thus gradually turned on, so that the voltage at the power rail 12 gradually increases to the standby voltage. The voltage of the main power source 16 remains low, because when the power supply unit (PSU) is initially activated, the main power source 16 from the PSU has not yet turned on.

Referring back to FIG. 1, when the power source switching circuit 10 needs to be switched to main power, the first control signal 18A and the second control signal 18B are both switched to their main states, e.g., are set to a logically high value. The gate of the control transistor 24 is connected to the first control signal 18A, and thus setting the first control signal 18A to a logically high value sets the gate of the control transistor 24 to a logically high value, which turns on the control transistor 24. The gate of the delay transistor 26 is pulled to the ground 11 through the source and drain of the control transistor 24, which turns off the delay transistor 26. Because the delay transistor 26 is turned off, the gate 21 of the standby power transistor 20 is pulled up to a logically high level through resistor 23. The standby power transistor 20 turns off in response to the voltage at its gate 21 being pulled high, thus disconnecting the standby power source 14 from the power rail 12.

The second control signal 18B is connected to the gate of the connection transistor 27. The source of the connection transistor 27 is connected to ground 11. The drain of the connection transistor 27 is connected to the first terminal of resistor 46A. The first terminal of resistor 46B is connected to the standby power source 14. The second terminals of resistors 46A and 46B are connected to each other, the gate of main power transistor 22A, and the gate of main power transistor 22B. Together, resistors 46A and 46B act as a voltage divider.

When the second control signal 18B is in the standby state, the connection transistor 27 is off because the gate of the connection transistor 27 is set to a logically low value. In turn, the first terminal of resistor 46A is not connected to ground 11 through the connection transistor 27. The gates of the main power transistors 22A and 22B are thus pulled up to a logical high value provided by the standby power source 14 through resistor 46B.

When the second control signal 18B switches from the standby state to the main state and is set to a logically high value, the connection transistor 27 is turned on. The gates of the main power transistors 22A and 22B are pulled to ground through resistor 46A, and the source and drain of the connection transistor 27. The main power transistors 22A and 22B are thus turned on in response to the second control signal 18B switching from the standby state to the main state, which connects the power rail 12 to the main power source 16. The power rail 12 can thus begin providing the main voltage to the electronic circuit or device. The power source switching circuit 10 can also include a capacitor 44A and a resistor 44B that can be used to adjust how long it takes the main power transistors 22A and 22B to turn on and off. As noted above, the implementation illustrated in FIG. 1 utilizes two main power transistors 22A and 22B so that the high level of the resulting current flow can be withstood. Other implementations may utilize only a single main power transistor, or three or more main power transistors.

To switch back to the standby power source 14 from the main power source 16, the first control signal 18A and the second control signal 18B are switched back to their standby states, e.g., the first control signal 18A and the second control signal 18B are set to a logically low value. The connection transistor 27 and the main power transistors 22A and 22B are thus turned off, which disconnects the main power source 16 from the power rail 12. The control transistor 24 is also turned off, which reconnects the gate of the delay transistor 26 to the standby power source 14. In turn, the gate 21 of the standby power transistor 20 is reconnected to RC circuit 28 through the source and drain of the delay transistor 26.

The power source switching circuit 10 also includes a bypass circuit that includes a first bypass transistor 36A, a second bypass transistor 36B, and pull-up resistor 38. The gate of the first bypass transistor 36A is connected to the first control signal 18A. The source of the first bypass transistor 36A is connected to the ground 11. The drain of the first bypass transistor 36A is connected to one end of the pull-up resistor 38, and to the gate of the second bypass transistor 36B. The other end of the pull-up resistor 38 is connected to a bypass power source 40. The bypass power source 40 provides a logically high voltage, and is used to pull up the gate of the second bypass transistor 36B to a logically high value. In some implementations, the bypass power source 40 is a 5-volt power source. The gate of the second bypass transistor 36B is therefore connected to a logically high load. The source of the second bypass transistor 36B is connected to the ground 11. The drain of the second bypass transistor 36B is connected to the gate 21 of the standby power transistor 20.

When the first control signal 18A is in its main state, it has a logically high value, which turns on the first bypass transistor 36A. Because current can then flow through the drain and source of the first bypass transistor 36A, the gate of the second bypass transistor 36B is pulled to the ground 11 through the first bypass transistor 36A. The second bypass transistor 36B is therefore turned off and does not affect the voltage at the gate 21 of the standby power transistor 20 when the power source switching circuit 10 is providing the main power.

When the first control signal 18A switches back to its standby state, it has a logically low value, which turns off the first bypass transistor 36A. The gate of the second bypass transistor 36B is thus pulled up to a logically high value through the pull-up resistor 38 and the bypass power source 40, which turns on the second bypass transistor 36B. The gate 21 of the standby power transistor 20 is in turn immediately pulled to the ground 11 through the drain and source of the second bypass transistor 36B. Pulling the gate 21 of the standby power transistor 20 down to the ground 11 immediately turns on the standby power transistor 20, which connects the standby power source 14 to the power rail 12. Thus, the power rail 12 is able to smoothly transition between providing the main voltage and providing the standby voltage to the electronic component or system.

Without the bypass circuit, the voltage level at the gate 21 of the standby power transistor 20 would be controlled by the RC circuit 28 when the power source switching circuit 10 switches from the main mode back to the standby mode. When the first control signal 18A is in its main state, the voltage at the gate 21 of the standby power transistor 20 is pulled to a logically high value, thereby turning off the standby power transistor 20. Without the bypass circuit, when the first control signal 18A switches back to its standby state from its main state, the gate 21 of the standby power transistor 20 would immediately stay at a logically high value, and then slowly decrease as the capacitor 32 charges. Thus, the standby power transistor 20 would again slowly turn on, and slowly reconnect the standby power source 14 to the power rail 12.

Figure 3:
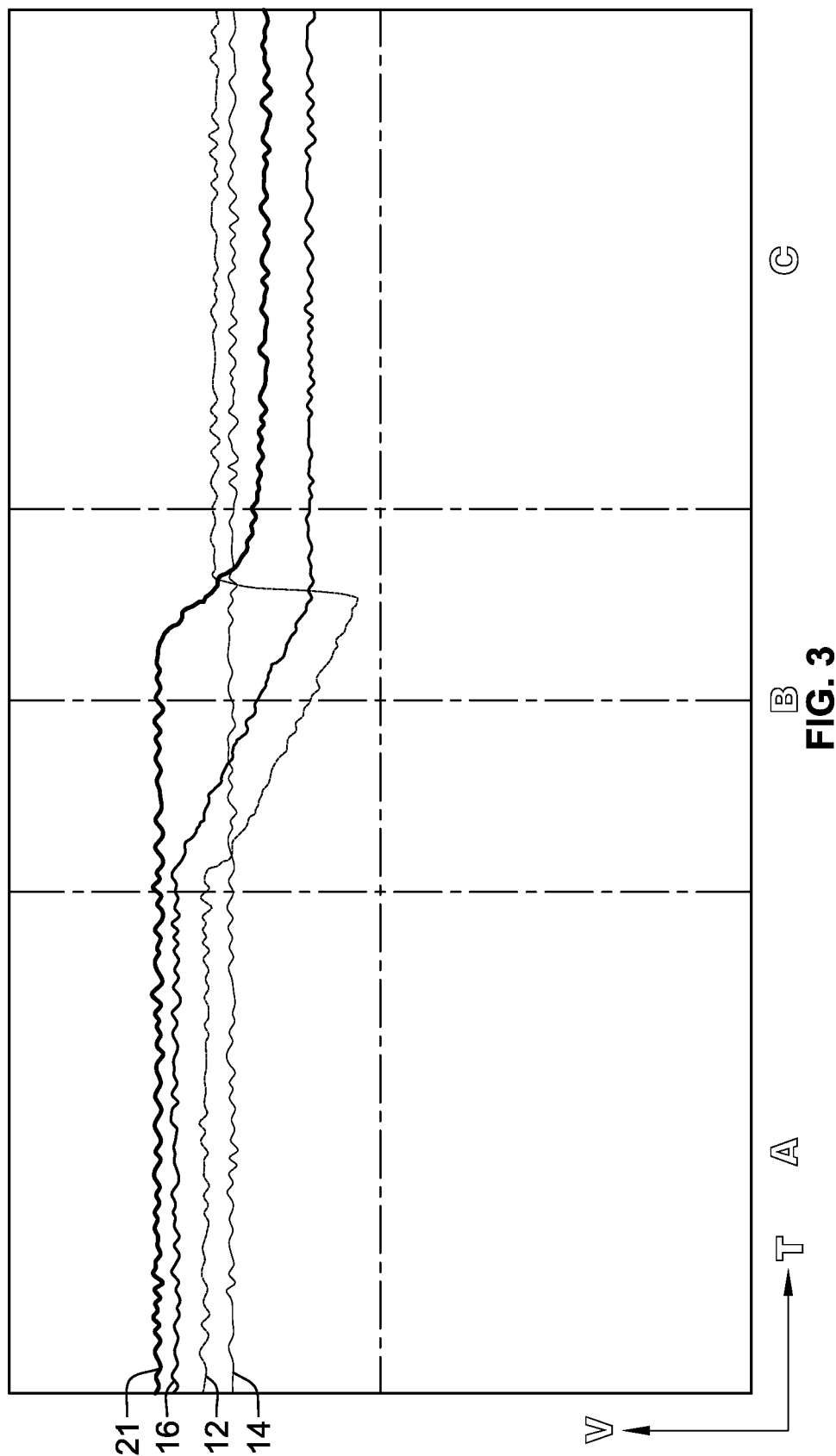
FIG. 3 is a voltage vs. time diagram showing the behavior of the power source switching circuit without the presence of a bypass circuit.

FIG. 3 shows a voltage vs. time diagram of what would occur in the power source switching circuit 10 (in FIG. 1) without the bypass circuit. The voltage vs. time diagram shows the voltage levels of the power rail 12, the standby power source 14, the main power source 16, and the gate 21 of the standby power transistor 20, when the power source switching circuit 10 switches from the main power source 16 back to the standby power source 14. In region A of the diagram, the power source switching circuit 10 is still in the main mode. Region B shows the behavior of the power source switching circuit 10 after the power source switching circuit 10 initially switches back to the standby mode from the main mode.

As can be seen, the voltage at the gate 21 of the standby power transistor 20 (in FIG. 1) initially remains high, leaving the standby power source 14 unconnected from the power rail 12. However, because the power rail 12 is also disconnected from the main power source 16, the voltage provided by the power rail 12 begins to temporarily decrease. The voltage at the gate 21 of the standby power transistor 20 slowly decreases as the capacitor 32 (in FIG. 1) of the RC circuit 28 (in FIG. 1) begins to charge. In region C, the voltage at the gate 21 of the standby power transistor 20 has fully decreased. The standby power transistor 20 is thus fully turned on, and the standby power source 14 is connected to the power rail 12. As such, the voltage of the power rail 12 has increased back to the standby voltage.

Figure 4:
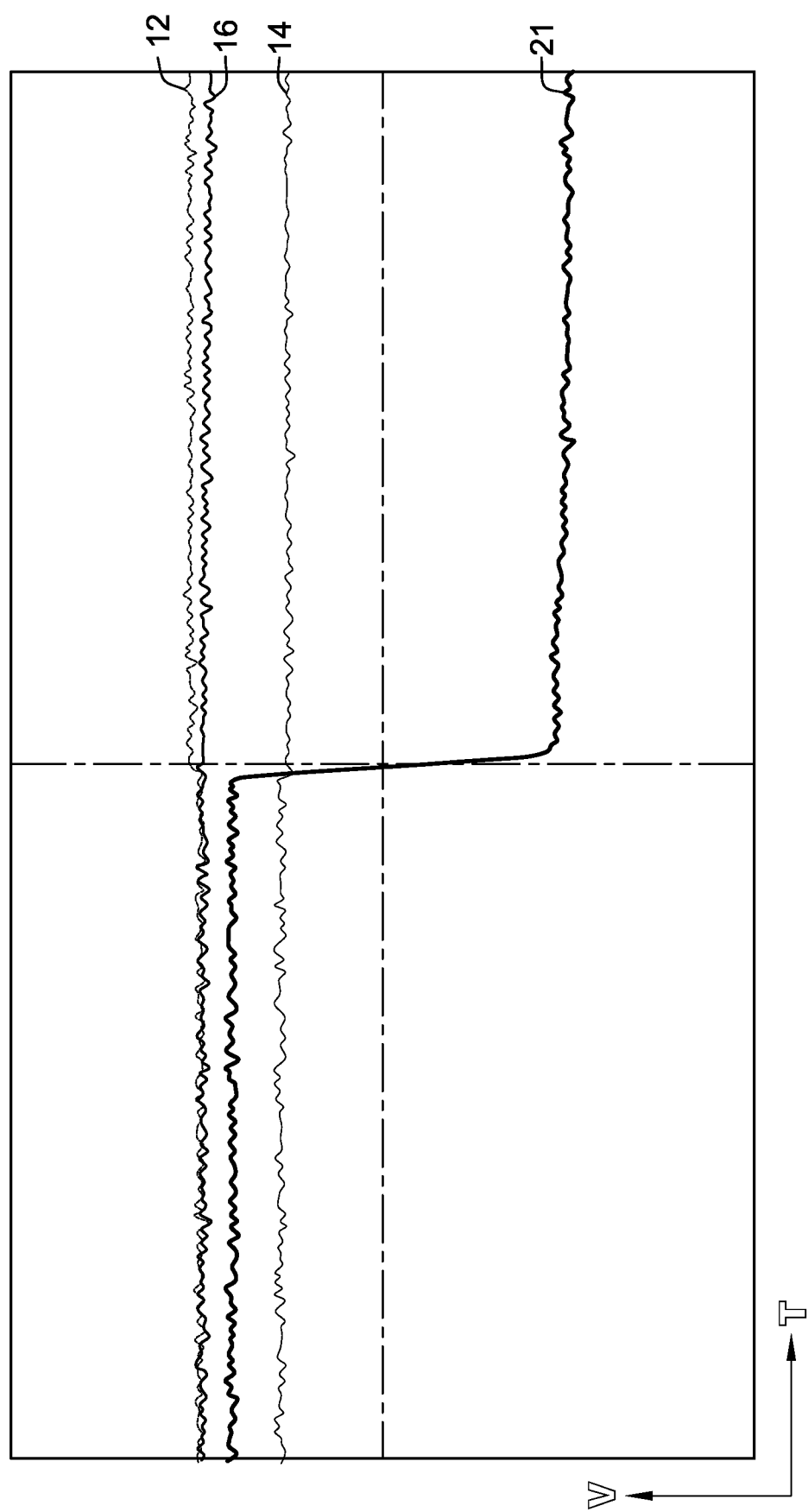
FIG. 4 is a voltage vs. time diagram showing the behavior of the power source switching circuit in the presence of the bypass circuit.

The presence of the bypass circuit in the power source switching circuit 10 prevents the temporary decrease in the voltage provided by the power rail 12. FIG. 4 shows a voltage vs. time diagram of the power source switching circuit 10 (in FIG. 1) with the bypass circuit. The voltages at the power rail 12, the standby power source 14, and the main power source 16 remain relatively constant. The voltage at the gate 21 of the standby power transistor 20 (in FIG. 1) immediately drops down to a logically low value when the power source switching circuit 10 switches from the main mode to the standby mode. The power rail 12 is thus able to immediately connect to the standby power source 14 when the first control signal 18A (in FIG. 1) switches from a logically high value to a logically low value. The voltage at the power rail 12 thus does not suffer from the temporary decrease that would have occurred if the bypass circuit was not present, as shown in FIG. 3.

Referring back to FIG. 1, the bypass circuit can be deactivated using the bypass power source 40. If the bypass circuit could not be deactivated, the bypass circuit would bypass the soft-start circuit when the power source switching circuit 10 is initially activated to the standby mode, which would prevent the soft-start circuit from gradually connecting the standby power source to the output. When deactivated, the bypass circuit does not bypass the soft-start circuit when the power source switching circuit 10 is initially activated. In some implementations, the bypass circuit is activated when the power source switching circuit 10 switches from the standby mode to the main mode for the first time. In this implementation, the bypass circuit is thus inactive when the power source switching circuit 10 is initially activated to the standby mode. The soft-start circuit is thus enabled when the power source switching circuit 10 is initially activated to the standby mode, and disabled for all subsequent switches from the main mode to the standby mode.

As explained above, the first control signal 18A has a logically low value when in its standby state, and a logically high value when in its main state. When the first control signal 18A switches from its main state back to its standby state, the gate of the second bypass transistor 36B is connected to the bypass power source 40, which allows the gate 21 of the standby power transistor to be immediately pulled to ground 11 through the second bypass transistor 36B, instead of gradually being pulled to ground 11 through the RC circuit 28.

However, the first control signal 18A also has a logically low value when the power source switching circuit 10 is initially activated to begin providing standby power. If the gate of the second bypass transistor 36B were to be connected to the bypass power source 40 when the power source switching circuit 10 is activated, the gate 21 of the standby power transistor 20 would be pulled to ground immediately upon activation through the second bypass transistor 36B, instead of gradually pulled to ground through the RC circuit 28. The soft-start functionality of the power source switching circuit 10 would thus not exist. To be able to still provide the soft-start functionality upon activation, the bypass circuit can be transitioned between an active state and an inactive state using the bypass power source 40, which itself can transition between an activate state and an inactive state to selectively provide the logically high voltage to the power source switching circuit 10.

When the power source switching circuit 10 is initially activated to the standby mode, the bypass power source 40 is set to its inactive state and does not provide the logically high voltage to the power source switching circuit 10. Thus, even though the first bypass transistor 36A is off, the gate of the second bypass transistor 36B is not pulled high, and thus the second bypass transistor 36B is turned off. The gate 21 of the standby power transistor is therefore gradually pulled to ground through the RC circuit 28, even though the first control signal 18A is low. By setting the bypass power source 40 to its inactive state to not provide the logically high voltage to the power source switching circuit 10, the bypass circuit is set to its inactive state When the first control signal 18A switches from its main state back to its standby state to switch the power source switching circuit 10 from the main mode to the standby mode, the bypass power source 40 is set to its activated state so as to activate the bypass circuit. In its activated state, the bypass power source 40 provides the logically high voltage to the power source switching circuit 10. Thus, when the first bypass transistor 36A is turned off by the first control signal 18A switching back to a logically low value, the gate of the second bypass transistor 36B is connected to the logically high voltage of the bypass power source 40, which pulls the gate of the second bypass transistor 36B to a logically high value and turns on the second bypass transistor 36B. The gate 21 of the standby power transistor 20 is thus immediately pulled to ground 11 through the second bypass transistor 36B upon the first control signal 18A switching from its main state to its standby state, instead of gradually being pulled to ground 11 through the RC circuit 28.

The bypass power source 40 can transition between its activate state and its inactive state in a variety of different ways. In one implementation, the separate power source is the output of a power converter is used to step down the voltage provided by the power rail 12. A variety of different power converters can be used, such as a buck converter or another type of DC-to-DC converter. In this implementation, an input of the power converter is connected to the power rail 12, while the output of the power converter is connected to the pull-up resistor 38. Prior to activation of the power source switching circuit 10, neither the standby power source 14 or the main power source 16 are connected to the power rail 12. Thus, the power rail 12 does not provide any voltage, and the output of the power converter (while connected to the pull-up resistor 38) does not provide the logically high voltage that is needed to turn on the second bypass transistor 36B.

When the power source switching circuit 10 is activated, the second bypass transistor 36B will be off because the output of the power converter is not providing the logically high voltage to the gate of the second bypass transistor 36B. Thus, the gate 21 of the standby power transistor 20 will slowly be pulled to ground through the RC circuit 28. Once the standby power transistor 20 has fully turned on and connected the standby power source 14 to the power rail 12, the output of the power converter will have risen to a logically high value. Thus, when the first control signal 18A subsequently switches from its main state to its standby state, the gate of the second bypass transistor 36B will be pulled to a logically high value by the output of the power converter. The second bypass transistor 36B will therefore be turned on, which will immediately pull the gate 21 of the standby power transistor 20 to ground through the second bypass transistor 36B, instead of gradually through the RC circuit 28.

Thus, in this implementation, the bypass circuit is activated only once the voltage at the power rail 12 has risen to a level sufficient to ensure that the voltage at the output of the power converter has risen to a logically high value. As such, the bypass circuit will be inactive when the power source switching circuit 10 is initially activated to the standby mode, and will only be activate after the power source switching circuit 10 first switches from the standby mode to the main mode. The bypass circuit will then be active for all subsequent switches from the main mode to the standby mode.

Other implementations for transitioning the bypass power source 40 between states can also be used. For example, the bypass power source 40 may be a separate power source that is connected to the pull-up resistor 38 by a switch. The switch can be a manual switch that is physically moveable between positions by a user. The switch could also be a remote switch that can be moved between positions remotely by the user. The switch could also be triggered by the voltage level at the power rail rising to a threshold voltage. When the switch is moved or triggered, the bypass power source 40 connects to the pull-up resistor 38 to thereby provide the logically high voltage to the power source switching circuit 10. Generally, any suitable method transitioning the bypass power source 40 between states can be utilized, so long as the bypass power source 40 does not provide the logically high voltage when the power source switching circuit 10 is initially activated to provide standby power at the power rail 12.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A power source switching circuit for powering an electronic component, comprising:
    a soft-start circuit;
    a first input connected to a standby power source;
    a second input connected to a main power source; and
    an output providing a voltage to the electronic component, the output configured to alternatively be electrically connected to the first input and the standby power source when the power source switching circuit is in a standby mode, or the second input and the main power source when the power source switching circuit is in a main mode,
    wherein the soft-start circuit is enabled when the power source switching circuit is initially activated to the standby mode, and
    wherein the soft-start circuit is disabled when the power source switching circuit subsequently switches from the main mode to the standby mode.

2. The power source switching circuit of claim 1, further comprising a bypass circuit connected to the soft-start circuit, the bypass circuit being inactive when the power source switching circuit is initially activated to the standby mode to thereby enable the soft-start circuit, the bypass circuit being active when the power source switching circuit switches from the main mode to the standby mode to thereby disable soft-start circuit.

3. The power source switching circuit of claim 2, wherein the bypass circuit is activated in response to power source switching circuit switching from the standby mode to the main mode, such that the bypass circuit is inactive when the power source switching circuit is initially activated to the standby mode.

4. The power source switching circuit of claim 1, wherein when the power source switching circuit is initially activated to the standby mode, the soft-start circuit causes the output to gradually connect to the standby power source, such that the voltage provided by the output gradually increases to a standby voltage, the voltage provided by the output reaching the standby voltage after a standby activation time delay.

5. The power source switching circuit of claim 4, wherein when the power source switching circuit switches from the main mode to the standby mode, the voltage provided by the output switches from a main voltage to the standby voltage after substantially no time delay.

6. The power source switching circuit of claim 4, further comprising:
    a main power transistor selectively electrically connecting the output to the main power source;
    a standby power transistor selectively electrically connecting the output to the standby power source; and
    a control signal selectively operable to have (i) a standby state wherein the output is connected to the standby power source and disconnected from the main power source, and (ii) a main state wherein the output is connected to the main power source and disconnected from the standby power source,
    wherein switching the control signal between the standby state and the main state switches the power source switching circuit between the standby mode and the main mode.

7. The power source switching circuit of claim 6, wherein the soft-start circuit further includes:
    a control transistor, a gate of the control transistor being connected to the control signal, a drain of the control transistor being connected to the standby power source, and a source of the control transistor being connected to ground; and
    a delay transistor, a gate of the delay transistor being connected to the drain of the control transistor and the standby power source, a drain of the delay transistor being connected to a gate of the standby power transistor, and a source of the delay transistor being connected to an RC circuit.

8. The power source switching circuit of claim 7, wherein the control transistor turns off to connect the gate of the delay transistor to the standby power source and turn on the delay transistor, responsive to the control signal being in the standby state.

9. The power source switching circuit of claim 8, wherein the turning on of the delay transistor connects the gate of the standby power transistor to the RC circuit through the drain and the source of the delay transistor, the RC circuit causing the standby power transistor to gradually turn on and gradually connect the standby power source to the output.

10. The power source switching circuit of claim of claim 9, wherein the RC circuit includes a resistor and a capacitor connected in parallel, and wherein a time constant of the RC circuit is substantially equal to the standby activation time delay.

11. The power source switching circuit of claim 7, wherein the control transistor turns on to connect the gate of the delay transistor to ground and turn off the delay transistor, responsive to the control signal being in the main state, and wherein the turning off of the delay transistor turns off the standby power transistor with substantially no time delay.

12. The power source switching circuit of claim 6, further comprising a first bypass transistor and a second bypass transistor, the first bypass transistor having a gate connected to the control signal, such that the first bypass transistor turns on in response to the control signal switching from the main state to the standby state, the second bypass transistor having a gate connected to both the drain of the first bypass transistor and a bypass power source, the bypass power source selectively providing a logically high voltage.

13. The power source switching circuit of claim 12, wherein (i) a source of the first bypass transistor is connected to ground and (ii) a drain of the first bypass transistor is connected to the gate of the second bypass transistor, and wherein (i) a source of the second bypass transistor is connected to ground and (ii) a drain of the second bypass transistor is connected a gate of the standby power transistor.

14. The power source switching circuit of claim 13, wherein the gate of the second bypass transistor is pulled to a logically high value, and the second bypass transistor is turned on, in response to the control signal switching from the main state to the standby state and turning off the first bypass transistor.

15. The power source switching circuit of claim 14, wherein the gate of the standby power transistor is pulled to a logically low level and the standby power transistor is turned on with substantially no time delay, in response to the control signal switching from the main state to the standby state.

16. The power source switching circuit of claim 13, wherein the gate of the second bypass transistor is pulled to a logically low level and the second bypass transistor is turned off, in response to the control signal being in the main state and turning on the first bypass transistor.

17. The power source switching circuit of claim 16, wherein the gate of the standby power transistor is pulled to a logically high level, and the standby power transistor is turned off, in response to the control signal being in the main state.

18. The power source switching circuit of claim 13, wherein the bypass power source does not provide the logically high voltage to the drain of the first bypass transistor and the gate of the second bypass transistor when the power source switching circuit is initially activated to the standby mode, to thereby enable the soft-start circuit.

19. The power source switching circuit of claim 18, wherein the bypass power source provides the logically high voltage to the drain of the first bypass transistor and the gate of the second bypass transistor when the power source switching circuit switches from main mode to standby mode, to thereby disable the soft-start circuit.

20. The power source switching circuit of claim 12, further comprising a power converter having an input and an output, the input of the power converter being connected to the output of the power source switching circuit, the output of the power converter forming the bypass power source, such that the output of the power converter provides the logically high voltage when the power source switching circuit switches from the main mode to the standby mode after being initially activated to the standby mode.

* * * * *